United States Patent
Schwartz et al.

(10) Patent No.: US 9,109,818 B2
(45) Date of Patent: Aug. 18, 2015

(54) ELECTROCALORIC COOLER AND HEAT PUMP

(71) Applicant: Palo Alto Research Center Incorporated, Palo Alto, CA (US)

(72) Inventors: David E. Schwartz, San Carlos, CA (US); Dirk DeBruyker, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 166 days.

(21) Appl. No.: 14/033,240

(22) Filed: Sep. 20, 2013

(65) Prior Publication Data
US 2015/0082809 A1  Mar. 26, 2015

(51) Int. Cl.
 F25B 21/00 (2006.01)
(52) U.S. Cl.
 CPC .......... *F25B 21/00* (2013.01); *F25B 2321/001* (2013.01)
(58) Field of Classification Search
 CPC ... F25B 21/00; F25B 2321/001; H01L 37/02; Y02B 30/66; Y02T 29/49359
 USPC .......... 62/3.1, 3.2, 3.3, 3.6, 56, 113, 62, 513, 62/440; 165/185, 270, 276, 287; 361/688, 361/700; 136/207
 See application file for complete search history.

(56) References Cited

U.S. PATENT DOCUMENTS

| | | | | |
|---|---|---|---|---|
| 5,644,184 | A * | 7/1997 | Kucherov | 310/306 |
| 8,739,553 | B2 * | 6/2014 | Kruglick | 62/3.1 |
| 2010/0175392 | A1 * | 7/2010 | Malloy et al. | 62/3.2 |
| 2011/0016885 | A1 * | 1/2011 | Zhang et al. | 62/3.1 |
| 2011/0146308 | A1 * | 6/2011 | Casasanta | 62/113 |
| 2011/0315181 | A1 * | 12/2011 | Erbil et al. | 136/201 |
| 2011/0316385 | A1 * | 12/2011 | Erbil et al. | 310/306 |
| 2012/0222427 | A1 * | 9/2012 | Hassen | 62/3.1 |

(Continued)

OTHER PUBLICATIONS

Olsen, Randall, et al., "Pyroelectric conversion cycles", J. Appl. Phys., vol. 58, No. 12, pp. 4709-4716 (Dec. 1985).

(Continued)

*Primary Examiner* — Mohammad M Ali
(74) *Attorney, Agent, or Firm* — Hollingsworth Davis, LLC (57) ABSTRACT

System and methods are disclosed for controlled thermal energy transfer. The system includes a thermal energy source, a thermal energy sink, spaced apart from the thermal energy source, an electrocaloric structure carried by a suspension and configured for alternating physical movement between thermal communication with the thermal energy source and thermal communication with the thermal energy sink, and a control signal source simultaneously providing both a temperature control signal for controlling the temperature of the electrocaloric structure and a movement control signal for controlling the alternating physical movement of the electrocaloric structure between thermal communication with the thermal energy source and thermal communication with the heat sink. Heating or cooling of a desired element may be provided. Movement control may be electrostatic, magnetic, mechanical, etc., and is self-synchronizing with the field employed for temperature control in the electrocaloric structure.

22 Claims, 6 Drawing Sheets

(56) References Cited

U.S. PATENT DOCUMENTS

| | | | |
|---|---|---|---|
| 2012/0266591 A1* | 10/2012 | Morimoto et al. | 60/527 |
| 2012/0267090 A1* | 10/2012 | Kruglick | 165/270 |
| 2012/0285179 A1* | 11/2012 | Morimoto et al. | 62/3.1 |
| 2013/0067934 A1* | 3/2013 | Kruglick | 62/3.1 |
| 2013/0126003 A1 | 5/2013 | De Bruyker et al. | |
| 2013/0141207 A1 | 6/2013 | Schwartz et al. | |

OTHER PUBLICATIONS

Epstein, Richard, et al., "Electrocaloric devices based on thin-film heat switches", J. . Appl. Phys., vol. 106, No. 064509 (2009).

Guyomar, Daniel, et al., "Toward Heat Energy Harvesting using Pyroelectric Material", Journal of Intelligent Material Systems and Structures 2009, vol. 20, pp. 265-271 (Jul. 11, 2008).

* cited by examiner

ELECTROCALORIC COOLER AND HEAT PUMP

BACKGROUND

The present disclosure is related to heat transfer devices and methods, and more specifically to electrocaloric heat pumps and coolers, systems, and methods employing same.

As is well-known, the electrocaloric effect is the ability of certain materials to increase or decrease in temperature when exposed to an applied electric field. Historically, the extent of temperature change in electrocaloric materials has been relatively small for relatively large electric fields, so that practical applications have been limited. Certain materials have recently shown promise for more efficient electrocaloric response. For example, polymers and co-polymers based on P(VDF-TrFE) and ceramic materials such as some based on PZT, have been shown to have relatively large electrocaloric effects. This has permitted the exploration of new applications for such materials.

SUMMARY

The present disclosure is directed to systems and processes for providing heat transfer utilizing electrocaloric materials. System and methods are disclosed for controlled heat energy transfer, such as for coolers and heat pumps.

According to one aspect of the disclosure, a system includes a thermal energy source, a thermal energy sink, spaced apart from the thermal energy source, an electrocaloric structure carried by a suspension and configured for alternating physical movement between thermal communication with the thermal energy source and thermal communication with the thermal energy sink, and a control signal source simultaneously providing both a temperature control signal for controlling the temperature of the electrocaloric structure and a movement control signal for controlling the alternating physical movement of the electrocaloric structure between thermal communication with the thermal energy source and thermal communication with the thermal energy sink. Heating or cooling of a desired element may be provided. Movement control may be electrostatic, magnetic, mechanical, etc., and is self-synchronizing with the field employed for temperature control in the electrocaloric structure. Self-synchronizing as used herein shall mean any common or connected source or control such that operation of the two functions (movement and temperature control) are commonly controlled at the point/time of their generation. That is, they are not independently controlled.

According to another aspect of the disclosure, a method for controlled thermal energy energy transfer includes providing a thermal energy source, providing a thermal energy sink, spaced apart from the thermal energy source, disposing an electrocaloric structure in between the thermal energy source and the thermal energy sink, the electrocaloric structure carried by a suspension and configured for alternating physical movement between thermal communication with the thermal energy source and thermal communication with the thermal energy sink, and simultaneously providing, by way of a control signal source, both a temperature control signal for controlling the temperature of the electrocaloric structure and a movement control signal for controlling the alternating physical movement of the electrocaloric structure between thermal communication with the thermal energy source and thermal communication with the thermal energy sink.

According to various aspects of the disclosure, the control signal source is configured such that the temperature control signal and the movement control signal are self-synchronizing. Further, according to various aspects, the temperature control signal and the movement control signal are the same signal.

In various implementations, a temperature sensor may be communicatively coupled to the electrocaloric structure and the control signal source. The control signal source is configured to be responsive to a temperature signal provided by the temperature sensor for adjusting the movement control signal from above a threshold whereby the electrocaloric structure is in thermal communication with the thermal energy sink to below a threshold whereby the electrocaloric structure is out of thermal communication with the thermal energy sink.

According to other aspects of the disclosure, at a first temperature control signal the electrocaloric structure is at a first temperature below a temperature of the thermal energy source, while substantially simultaneously at a first movement control signal the electrocaloric structure is in thermal communication with the thermal energy source, the electrocaloric structure thereby receiving thermal energy from said thermal energy source. At a second temperature control signal, the electrocaloric structure is at a second temperature above a temperature of the thermal energy sink, while substantially simultaneously at a second movement control signal the electrocaloric structure is in thermal communication with the thermal energy sink, the electrocaloric structure thereby transferring thermal energy to the thermal energy sink.

The above is a brief summary of a number of unique aspects, features, and advantages of the present disclosure. The above summary is provided to introduce the context and certain concepts relevant to the full description that follows. However, this summary is not exhaustive. The above summary is not intended to be nor should it be read as an exclusive identification of aspects, features, or advantages of the claimed subject matter. Therefore, the above summary should not be read as imparting limitations to the claims nor in any other way determining the scope of said claims.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that descriptions of well-known starting materials, processing techniques, components, equipment and other well-known details may merely be summarized or are omitted so as not to unnecessarily obscure the details of the present disclosure. Thus, where details are otherwise well-known, we leave it to the application of the present disclosure to suggest or dictate choices relating to those details.

Various techniques and apparatus are disclosed herein for alternately connecting an electrocaloric capacitor to heat sources and sinks as part of cooling or heating an object. In certain embodiments, the connection to source/sink is controlled by the same or a similar electric field and/or voltage used to modify the temperature of the electrocaloric capacitor.

According to one thermodynamic cycle, an appropriate electrocaloric material is disposed to be in physical contact with an object to be cooled. (In general, the electrocaloric material may alternatively be in contact with one or more other layers serving as a thermal pathway to the object to be cooled. However, for simplicity of explanation we refer herein to the case of direct contact between the electrocaloric material and the object to be cooled, and variations will be understood to be within the scope of the present description.) Initially, the temperature of the object to be cooled, $T_c$, is greater than the temperature of the electrocaloric material, $T_b$, which we indicate here as $T_b < T_c$. Over time, some amount of heat energy $\Delta Q$ from the object to be cooled is transferred to the electrocaloric material, cooling the object to be cooled and raising the temperature of the electrocaloric material to $T_b + \Delta T$.

The position of the electrocaloric material relative to the object to be cooled and a heat sink may then be changed such that the electrocaloric material leaves physical contact with the object to be cooled and is brought into physical contact with the heat sink. (In general, the electrocaloric material may alternatively be in contact with one or more other layers serving as a thermal pathway to the heat sink. However, for simplicity of explanation we refer herein to the case of direct contact between the electrocaloric material and the heat sink, and variations will be understood to be within the scope of the present description.) In certain embodiments, the temperature of the heat sink, $T_h$, is higher than $T_b + \Delta T$. Therefore, in order to effectively transfer heat from the electrocaloric material, an electric field is applied across the electrocaloric material to increase its temperature above $T_h$. This results in a transfer of heat energy from the electrocaloric material to the heat sink, thereby shuttling the heat energy from the object to be cooled to the heat sink. The electric field may be removed from the electrocaloric material, with the electrocaloric material returning to approximately $T_b$. And, the electrocaloric material may be returned to physical contact with the object to be cooled, and the process repeated. The above example provides cooling of a desired object. However, it will be appreciated that heating of a desired object may similarly be accomplished, as further discussed herein.

As illustrated in specific embodiments below, a voltage source provides a voltage across two layers, electrodes, terminals, etc. Two such layers, electrodes, terminals, etc. are disposed on opposite sides of an electrocaloric material. A voltage across those layers, electrodes, terminals, etc. controls the temperature of the electrocaloric material. In addition, one such layer, electrode, terminal, etc. may be disposed on or proximate a heat sink or heat source. A voltage across that layer, electrode, terminal, etc. and a corresponding layer, electrode, terminal, etc. on said electrocaloric structure may result in controlled motion of the electrocaloric structure. In certain embodiments, a single voltage may act as a control signal controlling both the temperature and position of electrocaloric structure. In this sense, the voltage may be referred to as a temperature control signal and as a motion control signal. Said another way, the single source can simultaneously provide both a temperature control signal and a motion control signal.

Figure 1:
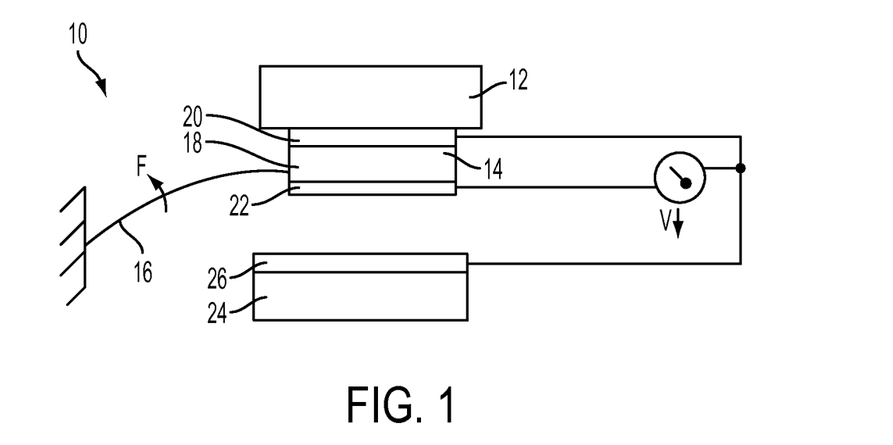
FIG. 1 is a schematic side-view of a structure for transferring thermal energy from a first body to a second body, in a first state, according to a first embodiment of the present disclosure.
Figure 2:
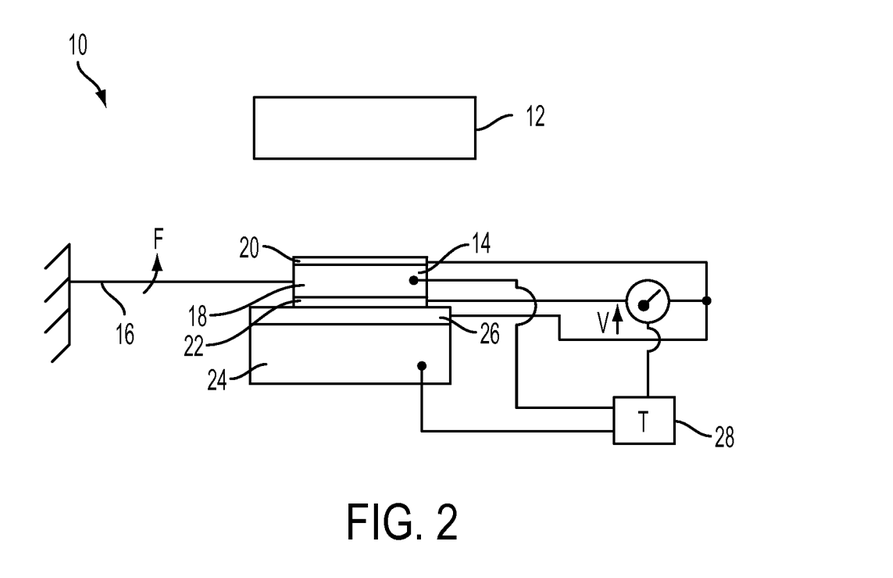
FIG. 2 is a schematic side-view of a structure for transferring thermal energy from a first body to a second body, in a second state, according to a first embodiment of the present disclosure.

With reference to FIGS. 1 and 2, a first embodiment 10 of a heat transfer system according to the present disclosure is illustrated. An object to be cooled 12 is at an initial temperature $T_1$. An electrocaloric structure 14, carried by a suspension 16, is disposed to be in physical contact with object 12. This contact can, for example, be a result of bias applied by the suspension, which may be a spring or the like (with variations discussed further herein).

According to some embodiments, electrocaloric structure 14 comprises an electrocaloric body 18 (for example polymers and co-polymers such as poly[(vinylidenefluoride-co-trifluoroethylene] [P(VDF-TrFE)], ceramic materials such as lead zirconium titanate PZT, etc.) having ohmic layers 20, 22 on top and bottom surfaces. Ohmic layers 20, 22 are electrically connected, for example, to a switchable voltage source V. Switchable voltage source V provides a signal, in the form of a voltage, to selectively produce an electric field within the electrocaloric material 18. In the absence of an electric field, or alternatively where the field assumes a first state (indicated by V↓), electrocaloric structure 14 is at a temperature $T_2$ such that $T_2 < T_1$. Electrocaloric structure 14 will change temperature by an amount $\Delta T_1$, such that electrocaloric structure 14 attains a new temperature $T_2 + \Delta T_1$.

A heat sink structure 24 is disposed proximate but physically spaced apart from electrocaloric structure 14 in the V↓ state. Heat sink structure 24 may include a passivated ohmic layer 26, or similar structure, electrically connected to a voltage source, and indeed in certain embodiments connected to voltage source V. This connection is such that when a voltage is applied across ohmic layer 22 and ohmic layer 26 an electric field is created, or alternatively the field assumes a second state (indicated by V↑), attracting ohmic layer 22 and ohmic layer 26 to one another. This results in electrocaloric structure 14 moving out of physical contact with object 12 and into physical contact with sink 24 (via passivated ohmic layer 26).

The electric field (V↑) is also applied to electrocaloric material 18 by way of the voltage across ohmic layers 20, 22. This increases the temperature of electrocaloric material 18, by way of the electrocaloric effect, to a new temperature $T_3$, such that $T_3 > T_2 + \Delta T_1$.

Heat sink 24 is initially at a temperature $T_4$ such that $T_3>T_4$. Some amount of the heat energy, $\Delta Q_2$, may then be transferred from electrocaloric structure 14 to heat sink 24. Heat energy is thereby shuttled from object 12 to sink 24. The voltage source may then be switched to below a set threshold to decrease or remove the electric fields, resulting in a cooling of electrocaloric material 18 to a temperature $T_2$, and a return of electrocaloric structure 14 by way of spring force F to physical contact with object 12. The above process may then be repeated. When a single voltage source V is used to generate the fields for both motion of electrocaloric structure 14 and temperature change within the electrocaloric material 18, self-synchronizing electric field generation for these purposes is obtained.

It will be noted that the aforementioned description applies to at least substantially steady-state operation of the system. When operation of such a system is initiated there will be a startup time during which the object to be cooled will gradually decrease in temperature until a steady-state temperature is reached (or nears steady-state such that some temperature cycling occurs with each phase of motion of electrocaloric structure 14). Furthermore, if the temperature of the heat sink, or the heat output of the object to be cooled, or similar parameter changes, the system will not operate at steady state. In general, the steady state description provides an example of the system in operation, and one of ordinary skill in the art will understand that such a system will operate differently under different operating conditions.

Alternatively to using the same applied voltage for the motion and temperature control signals, the timing and waveform of the decrease in voltage between ohmic layers 18, 22 and between ohmic layers 22, 26 may be controlled to optimize the thermal energy transfer between electrocaloric material 14 and the heat sink 24. For example, in order to maximize the extraction of heat from electrocaloric material 18, and hence the thermal efficiency of the device and process, the voltage may be decreased when it is sensed, for example by a sensor 28, that the temperature of electrocaloric material 18 and heat sink 24 are within a set threshold of one another. Furthermore, given that the movement of electrocaloric structure 14 between object 12 and heat sink 24 is not instantaneous, a voltage decreasing pattern or waveform may be employed, for example to decrease the voltage as the temperatures of electrocaloric material 18 and heat sink 24 approach one another, and further to initiate the movement of electrocaloric structure 14 by spring 16 (due to force F), such that as the two temperatures reach the set difference threshold electrocaloric structure 14 pulls away from heat sink 24. It will be appreciated that the temperature of other elements of the system (and ambient) may be used for timing control, voltage levels and waveform, etc., and those disclosed here are not intended to be limiting.

The above-described electrostatic actuation of electrocaloric structure 14 ideally requires that the system be designed such that the high electric fields do not lead to arcing across the gap between ohmic layers 22 and 26. One means of achieving this is for the process be conducted in at least a near-vacuum (e.g., $10^{-3}$ to $10^{-4}$ Torr), and that travel of electrocaloric structure 16 (i.e., the spacing between the object 12 and sink 24) be relatively small (e.g., on the order of several micrometers or less). In order to relax these conditions, other embodiments for actuation of electrocaloric structure 16 may be employed. For example, in place of the electrostatic actuation of the electrocaloric structure 16 (and the elements such as the ohmic layers therefor), a magnetic actuation arrangement is contemplated. In this embodiment, one or more of the aforementioned ohmic layers are replaced with electromagnetic coil structure, either formed in situ or applied to one or more of the surfaces of electrocaloric structure 14 and/or heat sink 24. Corresponding magnetic (ferrous) layers may be formed on electrocaloric structure 14 and/or heat sink 24 such that application of a voltage creates a magnetic field to attract electrocaloric structure 14 out of physical contact with object 12 and into physical contact with heat sink 24. The voltage used to create the motive magnetic field may also be used to create the electric field within the electrocaloric material, or alternatively synchronized with the voltage used to create the electric field, as described above, again resulting in self-synchronizing field generation.

Of course, many variations and alternate embodiments will present themselves given the present disclosure. For example, the ohmic layers may be formed as discrete electrode structures, full surface layers, etc. In addition, the number of layers and materials forming the contacts may be varied. Thermal communication between the electrocaloric structure and the object to be cooled and/or the heat sink may be via an electrode or the structure may be configured for direct physical contact between the electrocaloric material forming the electrocaloric layer and the object to be cooled and/or the reservoir. It will be appreciated that one or more surface layers such as thermal interface material, thermal grease, liquid film, liquid droplets, carbon nanotube "turf", etc., may also disposed on one or more of the electrocaloric structure, the object to be cooled, and/or the heat sink to improve thermal contact. The method of suspension of the stack may be varied, such as by coil spring, dual cantilever spring, magnetic biasing, etc. These variations are each capable of providing the function of a switched thermal pathway between an object to be cooled and a heat sink employing the electrocaloric effect of the materials comprising the system.

Figure 3:
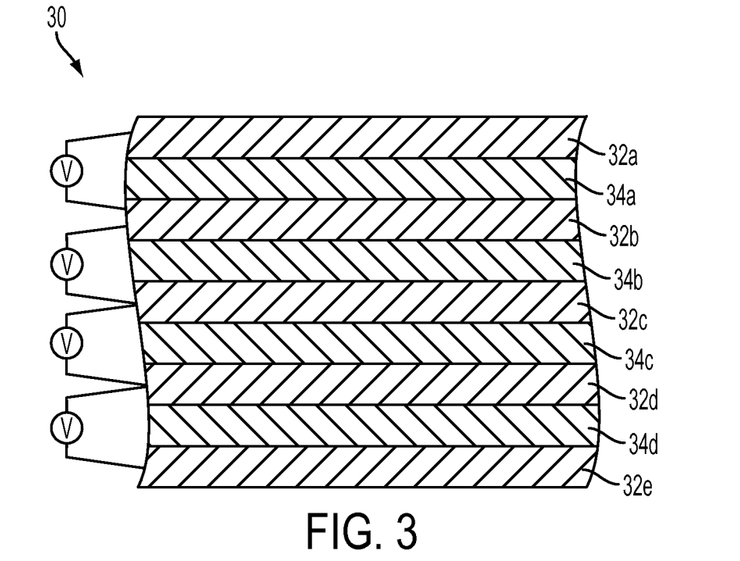
FIG. 3 is a cut-away side-view of a multi-layered electrocaloric structure according to an embodiment of the present disclosure.

In certain embodiments, an electrocaloric structure of the type described above may be a multi-layered structure such as illustrated in FIG. 3. Structure 30 is comprised of alternating layers of ohmic material 32 (e.g., metal) and electrocaloric material (e.g., P(VDF-TrFE), PZT, etc.) 34. While a function of the materials and sizes of the elements of the system, in certain embodiments, layer 32 may be on the order of 20 nm to 10 μm, and layer 35 on the order of 100 nm to 50 μm. Successive metal layers such as 32$a$ and 32$b$, 32$b$ and 32$c$, etc. may be electrically connected to voltage source V such that a field is generated within intervening electrocaloric layers 34$a$, 34$b$, etc. respectively. Such an arrangement permits providing a high electric field with limited voltage for a given volume of electrocaloric material.

Figure 4:
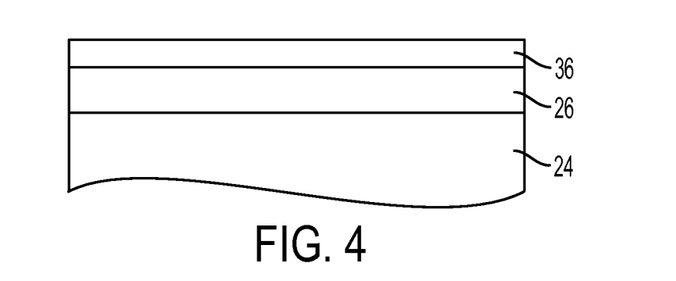
FIG. 4 is a cut-away side-view of a multi-layered electrocaloric structure illustrating a passivated structure according to an embodiment of the present disclosure.

According to the embodiment shown in FIGS. 1 and 2, ohmic layer 26 over heat sink 24 must be passivated to prevent shorting between ohmic layer 22 and ohmic layer 26. As shown in FIG. 4, this can be accomplished, for example, by application of a dielectric layer 36 over ohmic layer 26. Alternatively, ohmic layer 22 may have applied thereover a passivation layer, or both ohmic layer 22 and ohmic layer 26 may be passivated.

Figure 5A:
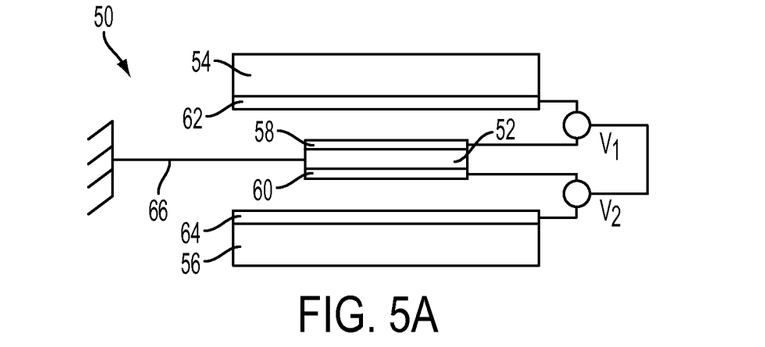
FIGS. 5A through 5C are schematic side-views of a structure for transferring thermal energy from a first body to a second body, in first, second, and third states, respectively, according to another embodiment of the present disclosure.
Figure 5B:
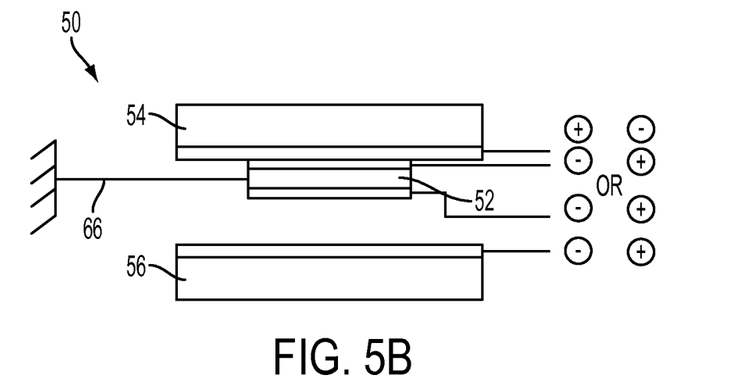
Figure 5C:
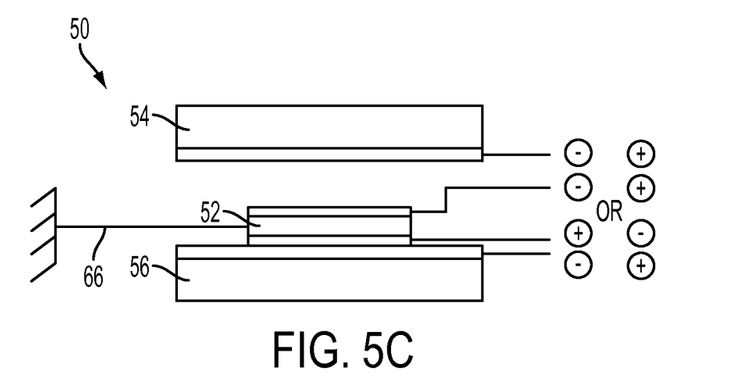

FIGS. 5A through 5C illustrate another embodiment 50 of the present disclosure, in three separate states of activation respectively. Similar to the embodiments described above, embodiment 50 comprises an electrocaloric structure 52 disposed an object to be cooled 54 and a heat sink 56. Electrocaloric structure 52 is suspended by one or more springs 66 or similar suspension mechanism, such that absent any field bias, electrocaloric structure 52 is suspended substantially between but not necessarily in contact with object to be cooled 54 and a heat sink 56. (Alternatively, as previously described, electrocaloric structure 52 may be in partial or full contact with either of object to be cooled 54 and a heat sink 56 in the absence of any electric field.) In the present embodiment, electrocaloric structure 52 is provided with first and second ohmic layers 58, 60, object 54 is provided with an ohmic layer 62, and heat sink 56 is provide with ohmic layer 64. Each ohmic layer is connected to a voltage supply such that a desired voltage polarity may be applied thereto. Again, in place of the ohmic layers for electrostatic actuation, coils and corresponding magnetic layers or other structures for electromagnetic actuation may alternatively be employed.

In operation of this embodiment, absent any voltage applied to the various ohmic layers, electrocaloric structure 52 will be disposed between and spaced apart from both object 54 and heat sink 56. This is illustrated in FIG. 5A. Upon application of voltages such that layer 62 has a first polarity, and layers 58, 60, and 64 have a second, opposite polarity, electrostatic attraction will cause electrocaloric structure 52 to be brought into physical contact with object 54. This is illustrated in FIG. 5B. Due to the polarities applied to layers 58 and 60 being the same, no field is generated within the electrocaloric structure. Electrocaloric structure 52 may then receive heat energy from object 54. Upon application of voltages such that layer 58, 62, and 64 have a second polarity, and layer 60 has a first, opposite polarity, electrostatic attraction will cause electrocaloric structure 52 to leave physical contact with object 54 and be brought into physical contact with heat sink 56. This is illustrated in FIG. 5C. The voltages applied to layers 58 and 60 are of opposite polarity, thus causing an increase in the temperature of electrocaloric structure 52 due to the electrocaloric effect. Heat sink 56 may then receive heat energy from electrocaloric structure 52.

Figure 6A:
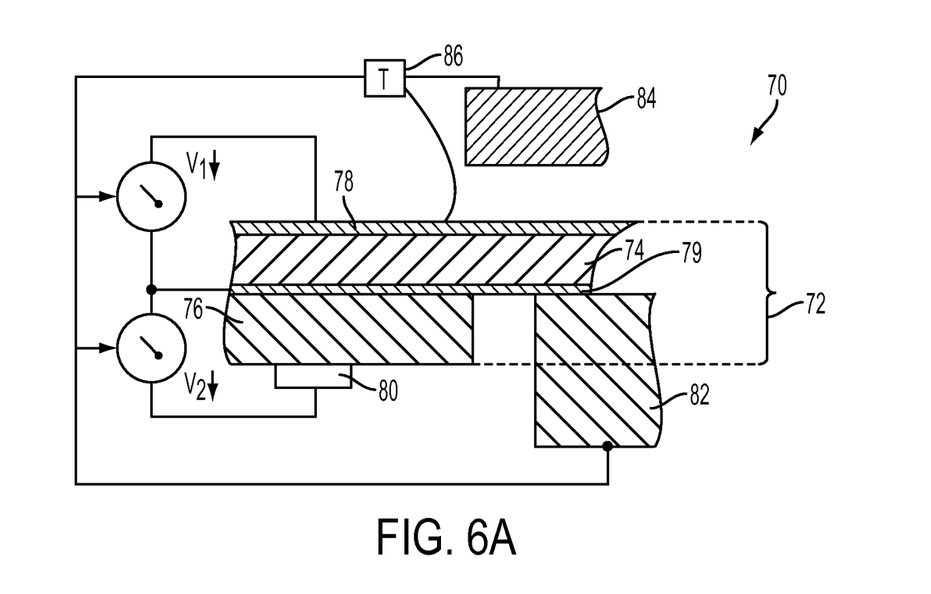
FIGS. 6A and 6B are cut-away side-views of a multi-layered electrocaloric structure including an electroactive layer, in first and second states, respectively, according to an embodiment of the present disclosure.
Figure 6B:
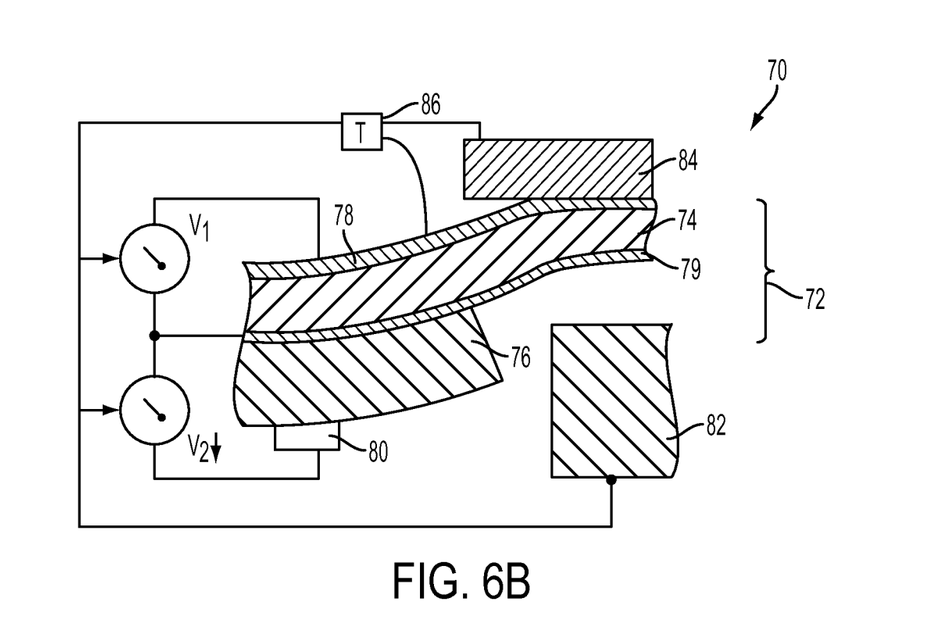

FIGS. 6A and 6B illustrate a further embodiment 70 of the present disclosure. Embodiment 70 comprises a layer structure 72 formed of a first layer 74 comprising an electrocaloric material and a second layer 76 comprising an electroactive polymer. An electroactive polymer experiences asymmetric strain, and hence flexes, when subject to an electric field. A first electrode 78 is disposed on electrocaloric material layer 74, and a second electrode 80 is disposed on electroactive polymer layer 76. A common electrode 79 may be disposed between electrodes 78 and 80, with intervening dielectric layers as needed. Electrodes 78, 80 are each electrically connected to voltage sources $V_1$, $V_2$, respectively, capable of applying voltages across electrodes 78-79 and 79-80 sufficient to generate fields of desired strength in each of layers 74, 76. These fields are capable of producing a temperature change in the electrocaloric material by way of the electrocaloric effect and deflection of the electroactive polymer.

The layered structure 72 is disposed between an object to be cooled 82 and a heat sink 84. Initially, layered structure 72 is disposed to be in contact with object 82 (or alternatively in contact with a low thermal resistivity path to such an object), when no voltage is applied across electrodes 78-79, 79-80 (or at least an insufficient electric field is generated to cause deflection of electroactive polymer layer 76). This is illustrated in FIG. 6A. In this position, layered structure 72 receives some heat energy from object 82, effectively cooling object 82. Optionally, the electrocaloric material layer 74 and the electroactive layer 76 may be configured such that electrocaloric material layer 74 may make direct physical (or thermal) contact with object 82 (and sink 84, depending on the state of the structure), such as by cantilevering the electrocaloric material layer 74 over the electroactive material layer 76, or other such arrangement.

As mentioned, according to this embodiment separate fields are generated in each of layers 74 and 76 by voltage sources $V_1$, $V_2$, respectively. It will be appreciated that the generation of these voltages are cooperatively controlled such that the temperature change and motion of layered structure 72 are self-synchronizing. Alternatively, the materials and dimensions of layers 74, 76 (and possibly electrodes, etc.) maybe selected such that a single voltage source (not shown) may produce a single electric field across electrodes 78, 80, resulting in a temperature change in the electrocaloric material 74 and a physical deformation of the electroactive polymer 76.

A voltage (provided by voltage source $V_2$) may then be applied between electrodes 79, 80 creating a sufficiently high electric field to cause the electroactive polymer layer 76 to deflect, such that layer structure 72 is caused to be removed from contact with object 82 and brought into contact with a heat sink 84 (or a low thermal resistivity path to a heat sink). This is illustrated in FIG. 6B. A second voltage from voltage source $V_1$ between electrodes 78, 79 also causes a rise in temperature of the electrocaloric material 74. If the net temperature of layer structure 72 exceeds the temperature of heat sink 84, thermal energy will be transferred from layer structure 72 to heat sink 84. The voltages between electrodes 78, 79 and between 79, 80 are then decreased or removed, permitting layer structure 72 to drop in temperature and return to contact with object 82, and the process repeated. In this way, the electrocaloric material 74 and electroactive polymer 76 are actuated in a self-synchronizing manner. By oscillating the voltages, this structure can be used to repeatedly extract heat from (cool) object 82 and reject that heat to the heat sink 84.

The timing and waveform of the decrease in voltage between electrodes 78, 80 may be controlled to optimize the thermal energy transfer between the layer structure 72 and the heat sink 84. For example, in order to maximize the extraction of heat from layer structure 72, and hence the thermal efficiency of the device and process, the voltage may be decreased when it is sensed, for example by sensor 86, that the temperature of the layer structure and heat sink 84 are within a set threshold of one another. Furthermore, given that the relaxation of electroactive polymer 76 is not immediate upon removal of the voltage, a voltage decreasing pattern or waveform may be employed to, for example decrease the voltage as the temperatures of the layer structure and heat sink 84 approach one another, such that as the two temperatures reach the set difference threshold the layer structure 72 pulls away from heat sink 84.

While the examples thus far have been limited to individual electrocaloric structures disposed between thermal energy source and sink, according to a variation of the embodiments disclosed herein, an array of electrocaloric structures and intermediate structures may be disposed between thermal energy source and sink. For example, with reference to FIGS. 7A and 7B, an embodiment 90 is shown comprising an object to be cooled 92, a heat sink 94, and a plurality of electrocaloric structures 96a, 96b, etc. As previously discussed, various of electrocaloric structures 96a, 96b, etc. may have affixed ohmic layers (not shown), which in turn may be passivated to prevent shorting in electrostatically-actuated embodiments.

Figure 7A:
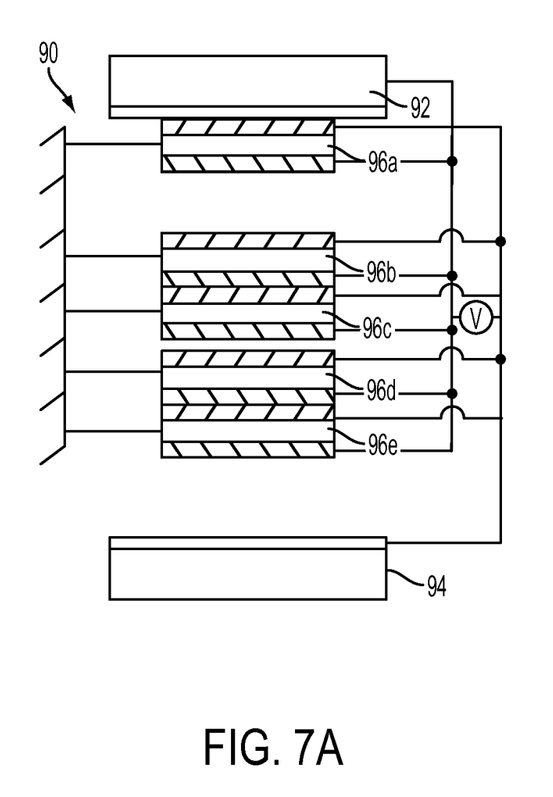
FIGS. 7A and 7B are cut-away side-views of an embodiment of an electrocaloric thermal energy transfer device including multiple electrocaloric structures, in first and second states, respectively, according to an embodiment of the present disclosure.

FIG. 7A illustrates one configuration of the device in which the first electrocaloric structure 96a is in thermal contact with the object to be cooled 92, and is physically separated from the second electrocaloric structure 96b. Structure 96c is, in turn, in thermal contact with structure 96b, but is physically separated from structure 96d. In this way, the electrocaloric structures are pairwise in thermal contact. The last electrocaloric structure 96e is physically separated from the heat sink 94 (although this description is not limited to a pattern of 5 electrocaloric structures, and may repeat an arbitrary number of times).

The first configuration shown in FIG. 7A may be effected by a physical bias, such as a spring, or an electrostatic force created by a first voltage applied between object to be cooled 92 and first electrocaloric structure 96a, a second voltage applied between second electrocaloric structure 96b and third electrocaloric structure 96c, etc., or by another mechanism as described previously.

While in the configuration shown in FIG. 7A, relatively high voltages are applied across electrocaloric structures 96b, 96d, while no voltage, or relatively low voltages are applied across electrocaloric structures 96a, 96c, and 96e, such that the temperature of electrocaloric structure 96a is lower than the temperature of the object to be cooled 92, the temperature of electrocaloric structure 96c is lower than the temperature of electrocaloric structure 96b, and the temperature of electrocaloric structure 96e is lower than the temperature of electrocaloric structure 96d. In this way, heat is transferred from the object 92 to structure 96a, from structure 96b to structure 96c, and from structure 96d to structure 96e.

In some embodiments, the relatively high voltages across structures 96b and 96d may be the same voltages that generate electrostatic attraction between the various thermally connected elements. In this way the device is "self-synchonized" as previously described.

Figure 7B:
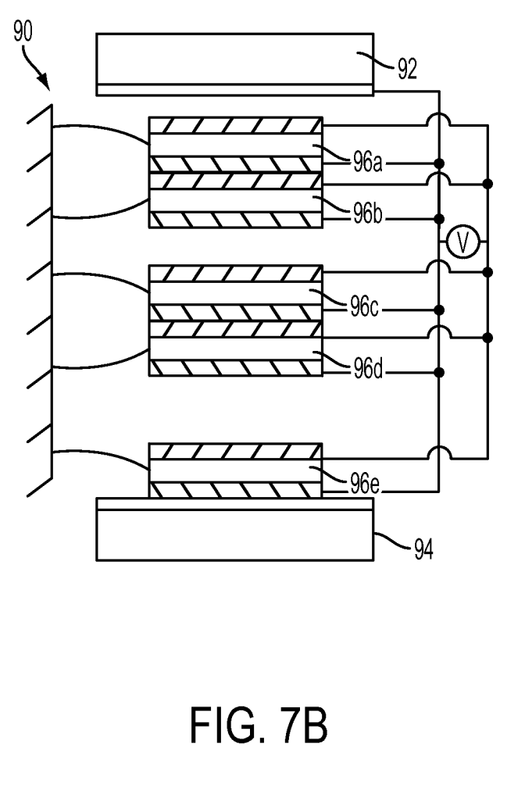

After heat is transferred for an amount of time which may be fixed, determined by a temperature-based control system as previously described, or by some other mechanism, the configuration of the system is changed to a second configuration shown in FIG. 7B. In some embodiments, this is effected by applying voltages between structure 96a and structure 96b, between structure 96c and structure 96d, and between structure 96e and the heat sink 94. In some embodiments the electrostatic voltages between object 92 and structure 96a, between structure 96b and structure 96c, between structure 96d and structure 96e are reduced. In other embodiments, magnetic forces, electroactive polymers, or other means as previously described effect the transition between configurations.

While in the second configuration, relatively high voltages are applied across electrocaloric structures 96a, 96c, and 96e such that their temperatures increase, while no voltages or relatively low voltages are applied across electrocaloric structures 96b and 96d, such that the temperature of structure 96b is lower than that of structure 96a, the temperature of structure 96d is lower than that of 96c, and the temperature of the heat sink 94 is lower than that of structure 96e. In this way, heat is transferred from the structure 96a to structure 96b, from structure 96c to structure 96d, and from structure 96e to heat sink 94.

In various embodiments, the relatively high voltages across structures 96a, 96c, and 96e may be the same voltages that generate electrostatic attraction between the various thermally connected elements, that actuate the electroactive polymers, or that energize magnetic or other means of actuation.

Again, while FIGS. 7A and 7B show five electrocaloric structures 96a, 96b, 96c, 96d, and 96e, this is merely one embodiment used for illustrating the general principles of the present disclosure, and systems with fewer or more electrocaloric structures may be used.

Figure 8:
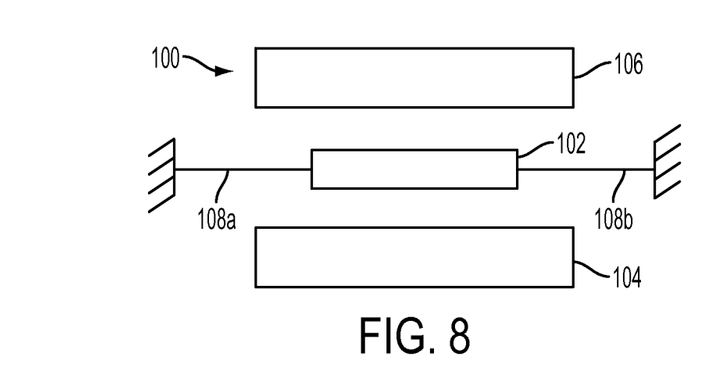
FIG. 8 is a schematic side-view of a structure for transferring thermal energy from a first body to a second body, with an alternate suspension element, according to an embodiment of the present disclosure.
Figure 9:
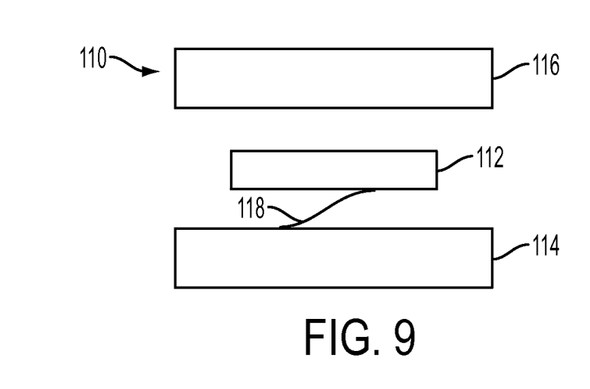
FIG. 9 is a schematic side-view of a structure for transferring thermal energy from a first body to a second body, with a further alternate suspension element, according to an embodiment of the present disclosure.
Figure 10:
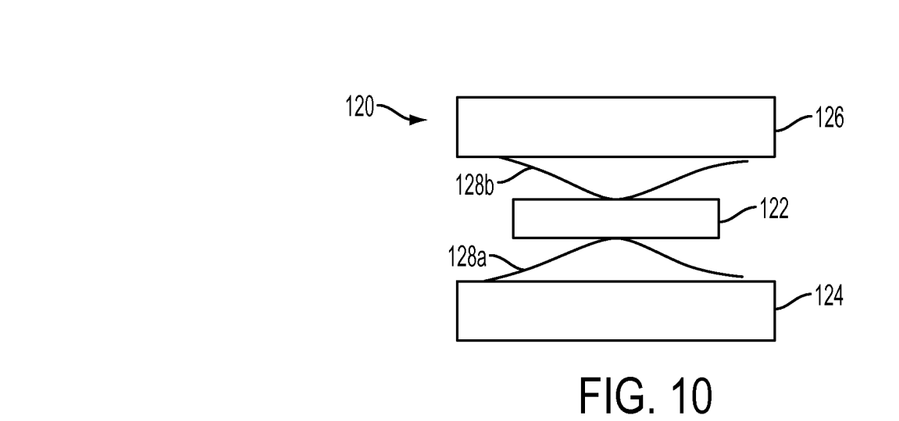
FIG. 10 is a schematic side-view of a structure for transferring thermal energy from a first body to a second body, with a still further alternate suspension element, according to an embodiment of the present disclosure.

As shown and described with regard to the various embodiments above, an electrocaloric structure may be suspended from one side by a cantilever-type spring. This arrangement is shown for clarity, and is only one of many possible suspension embodiments. The method of suspension may be varied, such as by coil spring, multiple cantilever spring, magnetic biasing, etc. For example, in an embodiment 100 illustrated in FIG. 8, an electrocaloric structure 102 may equivalently be suspended between a thermal energy source 104 and sink 106 from multiple sides, by first spring 108a and second spring 108b (or additional or alternate springs, not shown, extending into the plane of FIG. 8). As another example, as shown in FIG. 9, according to embodiment 110 an electrocaloric structure 112 may be suspended between a thermal energy source 114 and sink 116 by way of a spring 118 disposed below electrocaloric structure 112. In these embodiments, the conductivity and passivation of springs and surfaces are determined so as to permit any of the above motive methodologies described above, such as electrostatic, magnetic, electroactive, etc. A still further embodiment 120 is shown in FIG. 10, according to which an electrocaloric structure 122 is suspended between a thermal energy source 124 and sink 126 from top and bottom, by first spring 128a and second spring 128b. Combinations of these suspension arrangements, and others not explicitly illustrated are also contemplated herein. These various embodiments illustrate that many different suspension arrangements are contemplated, and are not as such limiting to the scope of the claims of this disclosure.

It will be appreciated that while a cooling function has been described above, and heating function may alternatively be provided by the systems and methods disclosed herein. For example, in place of an object to be cooled, a heat source may be provided. The electrocaloric device may shuttle heat from the heat source to an object to be heated by again controlling motion of the electrocaloric device between the heat source and object to be heated synchronously with the application of an electric field controlling the temperature of the electrocaloric device. When the electrocaloric device is in thermal contact with the heat source, the field may be absent, and the electrocaloric device is initially cooler than the heat source. The electrocaloric device may receive heat from the heat source, then be moved, by a method and structure such as those described above, into thermal contact with the object to be heated. An electric field may be applied to the electrocaloric device elevating its temperature above that of the object to be heated, resulting in heat transfer from the electrocaloric device to the object to be heated. The field(s) controlling the electrocaloric device temperature and motion may be the same, originate from the same voltage, or otherwise by synchronized, such as by a common control of separate voltage supplies, such the system is "self-synchronizing". The electrocaloric device may be returned to thermal contact with the heat source, and the process repeated, again as described above.

It should be understood that when a first layer is referred to as being "on" or "over" a second layer or substrate, it can be directly on the second layer or substrate, or on an intervening layer or layers may be between the first layer and second layer or substrate. Further, when a first layer is referred to as being "on" or "over" a second layer or substrate, the first layer may cover the entire second layer or substrate or a portion of the second layer or substrate. For example, heat transfer between the electrocaloric material and the heat source/sink can be facilitated by adding a thermal interface material, thermal grease, liquid metal droplet array, or another similar treatment above or below selected layers or structures described above.

The physics of modern electrical devices and the methods of their production are not absolutes, but rather statistical efforts to produce a desired device and/or result. Even with the utmost of attention being paid to repeatability of processes, the cleanliness of manufacturing facilities, the purity of starting and processing materials, and so forth, variations and imperfections result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

What is claimed is:

1. A system for controlled thermal energy transfer, comprising:
   a thermal energy source;
   a thermal energy sink, spaced apart from said thermal energy source;
   an electrocaloric structure, said electrocaloric structure carried by a suspension and configured for alternating physical movement between thermal communication with said thermal energy source and thermal communication with said thermal energy sink; and
   a control signal source simultaneously providing both a temperature control signal for controlling the temperature of said electrocaloric structure and a movement control signal for controlling said alternating physical movement of said electrocaloric structure between thermal communication with said thermal energy source and thermal communication with said thermal energy sink.

2. The system of claim 1, wherein said control signal source is configured such that said temperature control signal and said movement control signal are the same signal.

3. The system of claim 1, wherein said suspension is configured to bias said electrocaloric structure into thermal communication with said thermal energy source in the absence of said movement control signal, and said control signal source is configured to provide said movement control signal for moving said electrocaloric structure out of thermal communication with said thermal energy source, against said bias, and into thermal communication with said thermal energy sink.

4. The system of claim 3, wherein said electrocaloric structure comprises a first ohmic contact and a second ohmic contact, and further wherein said control signal source is coupled to said first and second ohmic contacts such that an electric field is generated therebetween to effect a controllable temperature change in said electrocaloric structure.

5. The system of claim 4, further comprising a third ohmic contact formed as a portion of said thermal energy sink, and wherein said control signal source is coupled to said second and third ohmic contacts such that an electric field is generated therebetween to effect electrostatic movement of said electrocaloric structure out of thermal communication with said thermal energy source and into thermal communication with said thermal energy sink.

6. The system of claim 3, wherein said electrocaloric structure comprises an electrocaloric body having a first ohmic contact, a second ohmic contact, and one element of a pair comprising a magnetic material or electromagnet, and said thermal energy sink comprises the other of said magnetic material or electromagnet pair, and further wherein said control signal source is coupled to said first and second ohmic contacts such that an electric field is generated therebetween to effect a controllable temperature change in said electrocaloric structure and further wherein said control signal source is coupled to said electromagnet producing a magnetic field between said electromagnet and said magnetic material resulting in movement of said electrocaloric structure out of thermal communication with said thermal energy source and into thermal communication with said thermal energy sink.

7. The system of claim 3, wherein said suspension is an electroactive structure, and further wherein said control signal source provides a voltage producing a deformation of said electroactive structure resulting in movement of said electrocaloric structure out of thermal communication with said thermal energy source and into thermal communication with said thermal energy sink.

8. The system of claim 7, wherein said electrocaloric structure is formed over said electroactive structure to form a layered structure, said layered structure comprising a first ohmic contact and a second ohmic contact, and further wherein said control signal source is coupled to said first and second ohmic contacts such that an electric field is generated therebetween to effect both a controllable temperature change in said electrocaloric structure and said movement of said layered structure out of thermal communication with said thermal energy source and into thermal communication with said thermal energy sink.

9. The system of claim 8, wherein said layered structured is configured such that said electrocaloric structure is preferentially in thermal communication with either of said thermal energy source or said thermal energy sink as compared to said electroactive structure.

10. The system of claim 3, further comprising a temperature sensor communicatively coupled to said electrocaloric structure and said control signal source, and further wherein said control signal source is configured to be responsive to a temperature signal provided by said temperature sensor for adjusting said movement control signal from above a threshold whereby said electrocaloric structure is in thermal communication with said thermal energy sink to below a threshold whereby said electrocaloric structure is out of thermal communication with said thermal energy sink.

11. The system of claim 1, wherein said suspension is selected from the group consisting of: a spring secured to a lateral edge of said electrocaloric structure, a plurality of springs each secured to a different lateral edge of said electrocaloric structure, a spring secured to a primary planar surface of said electrocaloric structure, and a plurality of springs each secured to a different primary planar surface of said electrocaloric structure.

12. The system of claim 1, wherein said suspension is configured to position said electrocaloric structure between and isolated from thermal communication with each of said thermal energy source and thermal energy sink in the absence of said movement control signal.

13. A system for controlled thermal energy transfer, comprising:
- a thermal energy source;
- a thermal energy sink;
- a plurality of electrocaloric structures, arranged adjacent one another;
- a plurality of thermally conductive structures, each thermally conductive structure disposed between respective pairs of electrocaloric structures;
- a plurality of suspension elements, each said suspension element carrying and positioning one of said electrocaloric structures;
- each said electrocaloric structure and suspension element configured for alternating physical movement of said electrocaloric structure between a first position and a second position; and
- a plurality of control signal sources, each said source simultaneously providing both a temperature control signal for controlling the temperature of at least one of said electrocaloric structures and a movement control signal for controlling said alternating physical movement of at least one of said electrocaloric structures.

14. The system of claim 13, wherein said control signal sources are configured such that said temperature control signal and said movement control signal are the same signal.

15. The system of claim 13, wherein said electrocaloric structures are arranged in pairs, and said first position is such that each electrocaloric structure of each said pair of electrocaloric structures are biased away from one another, and said second position is such that each electrocaloric structure of each said pair of electrocaloric structures are biased toward one another.

16. The system of claim 15, wherein each said suspension is configured to bias its respective electrocaloric structure into said first position, and said control signal source is configured to provide said movement control signal for moving each said electrocaloric structure into said second position.

17. A method for controlled thermal energy transfer comprising:
- providing a thermal energy source;
- providing a thermal energy sink, spaced apart from said thermal energy source;
- disposing an electrocaloric structure in between said thermal energy source and said thermal energy sink, said electrocaloric structure carried by a suspension and configured for alternating physical movement between thermal communication with said thermal energy source and thermal communication with said thermal energy sink; and
- simultaneously providing, by way of a control signal source, both a temperature control signal for controlling the temperature of said electrocaloric structure and a movement control signal for controlling said alternating physical movement of said electrocaloric structure between thermal communication with said thermal energy source and thermal communication with said thermal energy sink.

18. The method of claim 17, wherein said control signal source provides said temperature control signal and said movement control signal as a single signal.

19. The method of claim 17, further comprising said suspension biasing said electrocaloric structure into thermal communication with said thermal energy source in the absence of said movement control signal, and said control signal source providing said movement control signal for moving said electrocaloric structure out of thermal communication with said thermal energy source, against said bias, and into thermal communication with said thermal energy sink.

20. The method of claim 17, wherein said control signal source is coupled to first and second ohmic contacts of said electrocaloric structure such that an electric field is generated therebetween to effect a controllable temperature change in said electrocaloric structure.

21. The method of claim 17, wherein said control signal source is coupled to an electromagnet such that a magnetic field is generated to effect said movement of said electrocaloric structure.

22. The method of claim 17, wherein:
- at a first temperature control signal said electrocaloric structure is at a first temperature below a temperature of said thermal energy source, while substantially simultaneously at a first movement control signal said electrocaloric structure is in thermal communication with said thermal energy source, said electrocaloric structure thereby receiving thermal energy from said thermal energy source; and
- at a second temperature control signal said electrocaloric structure is at a second temperature above a temperature of said thermal energy sink, while substantially simultaneously at a second movement control signal said electrocaloric structure is in thermal communication with said thermal energy sink, said electrocaloric structure thereby transferring thermal energy to said thermal energy sink.

* * * * *